United States Patent
Nicholas et al.

(10) Patent No.: US 9,804,647 B2
(45) Date of Patent: Oct. 31, 2017

(54) CONTINUOUSLY POWERED FIELD DEVICE

(75) Inventors: Davin S. Nicholas, Marshalltown, IA (US); Mitchell S. Panther, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 522 days.

(21) Appl. No.: 13/345,107

(22) Filed: Jan. 6, 2012

(65) Prior Publication Data

US 2013/0179697 A1    Jul. 11, 2013

(51) Int. Cl.
G06F 1/00 (2006.01)
G06F 1/26 (2006.01)
G06F 1/30 (2006.01)

(52) U.S. Cl.
CPC ............ G06F 1/263 (2013.01); G06F 1/30 (2013.01)

(58) Field of Classification Search
CPC .......... G06F 1/3203; G06F 1/30; G06F 1/263
USPC ........................................................ 713/300
See application file for complete search history.

(56) References Cited

U.S. PATENT DOCUMENTS

| | | | | |
|---|---|---|---|---|
| 6,092,207 A * | 7/2000 | Kolinski | ................. | G06F 1/263 713/323 |
| 7,058,835 B1 * | 6/2006 | Sullivan | .................... | G06F 1/30 713/300 |
| 7,523,331 B2 * | 4/2009 | Van Der Heijden | . | G06F 1/3225 713/300 |
| 2003/0023888 A1 | 1/2003 | Smith et al. | | |
| 2006/0072283 A1 | 4/2006 | Thompson et al. | | |
| 2010/0096929 A1 | 4/2010 | Wang | | |
| 2010/0162009 A1 * | 6/2010 | Togashi et al. | ............... | 713/300 |
| 2011/0219243 A1 * | 9/2011 | Humphrey et al. | .......... | 713/300 |
| 2011/0227416 A1 * | 9/2011 | Lecourtier | ..................... | 307/66 |

FOREIGN PATENT DOCUMENTS

| | | |
|---|---|---|
| CN | 1941542 A | 4/2007 |
| CN | 101546905 A | 9/2009 |
| CN | 101728867 A | 6/2010 |
| CN | 203217331 U | 9/2013 |

(Continued)

OTHER PUBLICATIONS

Search Report for PCT/US2013/020036, dated May 16, 2013.

(Continued)

Primary Examiner — Austin Hicks
(74) Attorney, Agent, or Firm — Marshall, Gerstein & Borun LLP

(57) ABSTRACT

A continuously powered field device for use in a process control system includes a field device housing, a primary power port disposed within or connected to the field device housing, and a power source switching module comprising a first power terminal, a second power terminal, and a third power terminal. The first power terminal is coupled to the primary power port, and the third power terminal is configured to deliver power applied to the third power terminal to at least a portion of the field device. The power source switching module is operable in a first state of operation to couple the first power terminal to the third power terminal, and the power source switching module is operable in a second state of operation to couple the second power terminal to the third power terminal.

13 Claims, 6 Drawing Sheets

(56) References Cited

FOREIGN PATENT DOCUMENTS

| JP | 2003092845 A | 3/2003 |
|---|---|---|
| JP | 2008500659 A | 1/2008 |
| RU | 2010304 | 3/1994 |
| RU | 104390 | 5/2011 |
| SU | 773831 | 10/1980 |
| SU | 1573503 | 6/1990 |

OTHER PUBLICATIONS

Written Opinion for PCT/US2013/020036, dated May 16, 2013.
International Preliminary Report on Patentability for PCT/US2013/020036, dated Jul. 8, 2014.
Examination Report for GC 2013-23279 dated Aug. 1, 2016.
Notice of Reasons for Refusal for JP 2014-551301 dated Aug. 3, 2016.
Final Office Action for RU2014131715 dated Sep. 13, 2016.
Office Action for Chinese Application No. CN201210599283.7 dated Aug. 3, 2016.
Communication Pursuant to Article 94(3) EPC for Application No. 13701128.4 dated Mar. 13, 2017.
Second Office Action for JP Application No. 201210599283.7 dated Mar. 8, 2017.
Final Decision of Rejection for JP Application No. 2014-551301 dated Jun. 7, 2017.

\* cited by examiner

CONTINUOUSLY POWERED FIELD DEVICE

FIELD OF THE INVENTION

The present invention relates generally to methods and apparatus for process control systems and, more specifically, to methods and apparatus for providing continuous power to a field device in a process control system.

DESCRIPTION OF THE RELATED ART

Process control systems, such as those used in chemical, petroleum and other processes, generally include one or more centralized or decentralized process controllers communicatively coupled to at least one host workstation, and to one or more process control and instrumentation devices, via analog, digital, or combined analog/digital buses. Field devices such as valves, valve positioners, switches, transmitters, and sensors (e.g., temperature, pressure, or flow rate sensors) perform various functions within the process, such as opening or closing valves or measuring process parameters. The process controller receives (via the communication buses) signals indicative of process measurements or process variables made by or associated with the field devices, implements a control routine based on the received information, and generates control signals which are sent over one or more of the buses to the field devices to control the operation of the process. Information from the field devices and the controller is typically made available to one or more applications executed by a host workstation to enable an operator to perform desired functions with respect to the process, such as viewing the current state of the process, modifying the operation of the process, etc.

"Smart" field devices that perform one or more process control functions have become prevalent in the process control industry. In addition to performing a primary function within the process (e.g., monitoring a temperature or controlling a valve position), each smart field device includes a memory and a microprocessor. The memory stores data pertaining to the device, and the microprocessor communicates with the controller and/or other devices, and/or performs secondary tasks such as self-calibration, identification, diagnostics, etc. A number of standard, open, digital or combined digital and analog communication protocols such as the Highway Addressable Remote Transducer (HART®), PROFIBUS®, FOUNDATION™ Fieldbus, WORLDFIP®, DeviceNet®, and Controller Area Network (CAN) protocols have been developed to enable smart field devices made by different manufacturers to communicate with one another while performing one or more process control functions. In particular, wireless mesh networks such as WirelessHART® and International Society of Automation (ISA) 100.11a standard networks have become increasingly popular in process control systems.

The different devices or function blocks within a process control system are typically configured to communicate with each other (e.g., over a wireless mesh network) to form one or more process control loops, the individual operations of which are spread throughout the process and are, therefore, decentralized. To maintain efficient operation of the overall process, and thus minimize plant shutdowns and lost profits, devices associated with the process control system must function properly and reliably. Typically, one or more experienced human operators are responsible for assuring that the devices within a process control system are operating efficiently, and for repairing or replacing malfunctioning devices.

As part of this responsibility, such operators typically must ensure that field devices in the process control system are properly powered. Typically, field devices used with wireless networks include battery-based power modules in order to avoid restricting the placement of the devices within a plant environment. When the electrical energy stored in a power module of a device is depleted below a certain level (e.g., below a certain voltage level, or below a percentage of the maximum voltage of the power module), an operator may receive a low-voltage indication via a host workstation. The operator then removes the depleted power module and installs a fully charged replacement power module.

In the period of time between removing the old module and installing the new module, however, the device experiences a "down time" during which the device lacks any power source. The down time of the device may have several deleterious effects on the process control system. First, because the field device is not operational during this down time, any primary function(s) of the field device may not be performed. For example, a monitoring field device will cease to collect data (e.g., sensor data) during the down time of the device. As another example, a valve positioner device will cease to increase or decrease air pressure to properly position a valve during the down time of the device. Moreover, in some process control systems, the down time of a field device leads to loss of data and/or delays relating to other devices in the system. For example, the down time of a field device may cause a loss of, or an increased propagation delay for, data that the unpowered device would normally relay to or from other field devices and/or process controllers. Furthermore, some field devices may perform functions critical to the process control system, and may cause the entire system to become temporarily disabled when the device is unpowered. For many process control systems, problems of this sort are further exacerbated by the amount of time it takes a field device to rejoin the network once a new power module has been installed, and/or by the amount of time it takes the process control system to efficiently reorganize itself once the field device has rejoined the network. In some instances, issues such as this can cause networks, and the process control systems that utilize those networks, to be inoperative or to operate inefficiently for long periods of time (e.g., hours).

SUMMARY

In accordance with one aspect of the disclosure, a continuously powered field device for use in a process control system includes a field device housing, a primary power port disposed within or connected to the field device housing, and a power source switching module. The power source switching module includes a first power terminal, a second power terminal, and a third power terminal. The first power terminal is coupled to the primary power port, and the third power terminal is configured to deliver power applied to the third power terminal to at least a portion of the field device. The power source switching module is operable in a first state of operation to couple the first power terminal to the third power terminal, and is operable in a second state of operation to couple the second power terminal to the third power terminal.

In further accordance with one or more preferred forms, the primary power port may be configured to couple to a primary power source via a removable coupling of the primary power source. The power source switching module may be in the second state of operation when the second power terminal is coupled to a backup power source and the primary power port is either i) not coupled to a primary power source or ii) coupled to the primary power source when the primary power source is unable to provide a threshold voltage level. The backup power source may be permanently coupled to the second power terminal, and may include at least one selected from the group consisting of: a battery, a capacitor, and an energy-storing ASIC. The power source switching module may be an analog switch including a set of diodes, and the threshold voltage level may be equal to a voltage level of the backup power source plus an offset voltage corresponding to a voltage drop mismatch of the set of diodes. The power source switching module may be a digital switch, and the threshold voltage level may be a predetermined threshold voltage level. The power source switching module may be a manually controllable switch.

The continuously powered field device may further include a backup power port disposed within or connected to the field device housing and coupled to the second power terminal, and the backup power port may be configured to couple to a backup power source via a removable coupling. The power source switching module may be in the first state of operation when the first power terminal is coupled to a primary power source via the primary power port and at least one selected from the group consisting of i) the backup power port is not coupled to the backup power source and ii) a voltage of the primary power source is above a threshold voltage level. The power source switching module may be in the second state of operation when the second power terminal is coupled to the backup power source via the backup power port and the primary power port is either i) not coupled to the primary power source or ii) coupled to the primary power source when the primary power source is unable to provide the threshold voltage level.

The continuously powered field device may further include a processor and a network interface communicatively coupled to the processor. The network interface may be configured to communicate according to a wireless mesh network protocol. The network interface may cause an indication relating to a voltage of a primary power source that is coupled to the primary power port to be transmitted to a workstation via a wireless network.

In accordance with another aspect, a method of providing continuous power to a field device in a process control system includes providing a field device housing, providing a primary power port disposed within or connected to the field device housing, providing a first power terminal, a second power terminal, and a third power terminal, the first power terminal being coupled to the primary power port and the third power terminal being configured to deliver power applied to the third power terminal to at least a portion of the field device, automatically coupling the first power terminal to the third power terminal during a first state of operation, and automatically coupling the second power terminal to the third power terminal during a second state of operation.

In further accordance with one or more preferred forms, the method may include automatically decoupling the second power terminal from the third power terminal during the first state of operation, and automatically decoupling the first power terminal from the third power terminal during the second state of operation.

In accordance with yet another aspect, a method of providing continuous power to a field device in a process control system includes providing a field device configured to couple to a removable power module, providing first contact areas disposed within or connected to the field device, the first contact areas being configured to engage contact areas of the removable power module, providing second contact areas disposed within or connected to the field device, the second contact areas being configured to engage contact areas of the backup power source, powering at least a portion of the field device via the removable power module when the contact areas of the removable power module are engaged with the first contact areas and the removable power module is providing at least a threshold voltage level, and powering at least the portion of the field device via the backup power source when at least one selected from the group consisting of i) the contact areas of the removable power module are not engaged with the first contact areas and ii) the removable power module is unable to provide at least the threshold voltage level.

DETAILED DESCRIPTION

Figure 1:
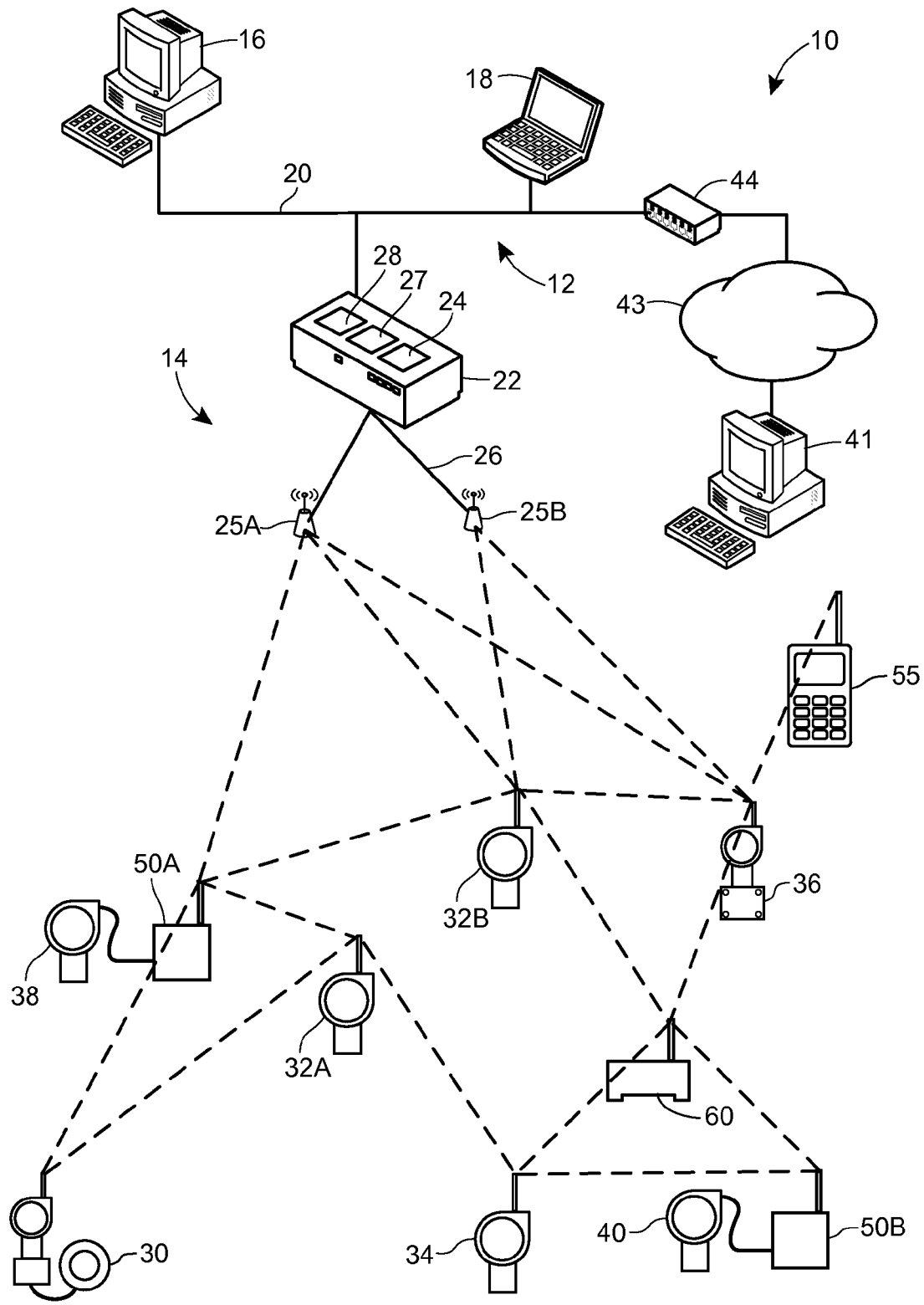
FIG. 1 is a block diagram of an example process control system in which the example methods and apparatus described herein may be implemented.

FIG. 1 illustrates an example process control system 5 in which the example methods and apparatus described herein may be implemented. The process control system 5 may include or be a part of a process control environment of an industrial or manufacturing plant, a factory, a sensor network, or any other environment in which process control techniques are used. The process control system 5 shown in FIG. 1 includes a communication network 10 that operates according to one or more industrial automation protocols. In particular, the communication network 10 may include a wired plant automation network 12 that utilizes or operates according to an industrial automation protocol (e.g., HART, PROFIBUS DP (Decentralized Peripherals), etc.) or some other communication protocol (e.g., Ethernet, RS-485, etc.). The communication network 10 may also include a wireless plant automation network 14 that utilizes or operates according to a wireless industrial automation protocol, such as a WirelessHART or ISA100.11a protocol, or another wireless network protocol that supports direct communication between field devices of the process control system 5. For clarity, the discussion herein refers to the WirelessHART communication protocol, although the techniques and principles described herein may apply to wireless plant automation networks that utilize other wireless industrial automation protocols in addition to or instead of WirelessHART, or to networks that utilize only wired communications.

Although FIG. 1 depicts the communication network 10 as including both a wired plant automation network 12 and a wireless plant automation network 14, the communication network 10 may instead include only the wired plant automation network 12 or only the wireless plant automation network 14. In one embodiment, the wireless plant automation network 14 is a wireless mesh communication network.

The wired plant automation network 12 may include one or more stationary host workstations 16 and one or more portable host workstations 18 connected over a communication backbone 20. A gateway 22 may be connected to the communication backbone 20 in a wired manner and may communicate with the wired plant automation network 12 using a suitable protocol. The gateway 22 may be implemented as a standalone device, as a card that can be inserted into an expansion slot of one of the host workstations 16 or 18, as part of an input/output (I/O) subsystem of a programmable logic controller (PLC) system or distributed control system (DCS), or in any other manner. For applications running on the wired plant automation network 12, the gateway 22 may provide access to various devices of the wireless plant automation network 14. In addition to protocol and command conversion, the gateway 22 may provide synchronized clocking that is used by time slots and superframes (i.e., sets of communication time slots that are spaced equally in time) of the scheduling scheme of the wireless plant automation network 14.

In some embodiments, the gateway 22 is functionally divided into a virtual gateway 24 and one or more network access points 25. In the process control system 5 shown in FIG. 1, the network access points 25 are separate physical devices in wired communication with the gateway 22. Alternatively, the elements 22-26 may instead be parts of an integral device, and/or the connections 26 may be wireless connections. Physically separate network access points 25 may be strategically placed in several distinct locations, thereby increasing the overall reliability of the communication network 10 by compensating for poor signal quality at the location of one or more of the network access points 25. Having multiple network access points 25 also provides redundancy in case of failure of one or more of the network access points 25.

The gateway device 22 may additionally contain a network manager software module 27 and a security manager software module 28. In another embodiment, the network manager software module 27 and/or the security manager software module 28 may run on a host workstation on the wired plant automation network 12. For example, the network manager software module 27 may run on the stationary host workstation 16 and the security manager software module 28 may run on the portable host workstation 18. The network manager software module 27 may be responsible for tasks such as configuration of the communication network 10, scheduling of communications between multiple WirelessHART devices (e.g., configuring superframes), management of routing tables, and monitoring and reporting of the health of the wireless plant automation network 14, for example. While redundant network manager software modules 27 may be supported, an example embodiment includes only one active network manager software module 27 per wireless plant automation network 14. The security manager software module 28 may be responsible for managing and distributing security encryption keys, and may maintain a list of devices that are authorized to join the wireless plant automation network 14 and/or the wired plant automation network 12, for example.

The wireless plant automation network 14 also includes one or more field devices 30-40. Each of the field devices 30-40 may be, for example, a valve, a valve positioner, a switch, a sensor (e.g., temperature, pressure, or flow rate sensor), a pump, a fan, etc., or a combination of two or more such devices. Field devices perform control, monitoring, and/or physical functions within a process or process control loop, such as opening or closing valves or taking measurements of process parameters, for example. In the example wireless plant automation network 14, the field devices 30-40 are also producers and consumers of wireless communication packets, such as WirelessHART packets. Some or all of the field devices 30-40 may additionally serve as routers for messages from and to other devices.

In the example process control system 5 shown in FIG. 1, an asset tracking host 41 configured to track assets of the process control environment is connected to a network 43 which, in turn, is connected to the wired plant automation network 12 via a router 44. The network 43 may be, for example, a public network such as the World Wide Web (WWW), a private network such as a private LAN, or some combination of one or more private and/or public networks. Alternatively, the asset tracking host 41 may belong to the plant automation network 12 or to the wireless plant automation network 14, and the network 43 and the router 44 may be omitted.

The field devices 30-36 may be WirelessHART devices, meaning that each of field devices 30, 32, 34, and 36 is provided as an integral unit supporting all layers of the WirelessHART protocol stack. For example, the field device 30 may be a WirelessHART flow meter, the field devices 32 may be WirelessHART pressure sensors, the field device 34 may be a WirelessHART valve positioner, and the field device 36 may be a WirelessHART vibration sensor. The field device 38 may be a legacy 4-20 mA device, and the field device 40 may be a wired HART device. In the example process control system 5 shown in FIG. 1, each of field devices 38 and 40 is connected to the wireless plant automation network 14 via a WirelessHART adaptor (WHA) 50. Each WHA 50 may also support other communication protocols such as FOUNDATION Fieldbus, PROFIBUS, DeviceNet, etc., in which case the WHA 50 supports protocol translation on a lower layer of the protocol stack. A single WHA 50 may additionally function as a multiplexer and support multiple HART or non-HART devices.

Plant personnel may use handheld or portable communication devices for setup, installation, control, monitoring, and/or maintenance of network devices and other plant equipment. Generally speaking, handheld devices are portable pieces of equipment that can connect directly to the wireless plant automation network 14, or connect to the wireless plant automation network 14 through the gateway 22 as a host on the wired plant automation network 12. In the example process control system 5 shown in FIG. 1, a handheld device 55 communicates directly with the wireless plant automation network 14. When operating with a formed wireless plant automation network 14, the handheld device 55 may join the wireless plant automation network 14 as another WirelessHART field device, for example. When operating with a target network device that is not connected to a WirelessHART network, the handheld device 55 may operate as a combination of the gateway device 22 and the network manager software module 27 by forming its own WirelessHART network with the target network device.

The wireless plant automation network 14 of the example process control system 5 also includes a router device 60. The router device 60 is a network device that forwards packets from one network device to another. A network device that is acting as a router uses internal routing tables to determine another network device to which the routing network device should forward a particular packet. Standalone routers such as the router 60 may not be required where other devices on the wireless plant automation network 14 support routing. However, it may be beneficial to add the dedicated router 60 to the wireless plant automation network 14 in order to extend the network, for example, or to save the power of field devices in the network.

All devices directly connected to the wireless plant automation network 14 may be referred to as network devices of the wireless plant automation network 14. In particular, the WirelessHART field devices 30-36, the WHA 50, the routers 60, the gateway 22, the network access points 25, and the handheld device 55 may, for the purposes of routing and scheduling, be referred to as the network devices of the wireless plant automation network 14. In order to provide a very robust and an easily expandable network, all network devices may support routing and each network device may be globally identified by its HART address. Moreover, the network manager software module 27 may contain a complete list of network devices and assign each device a network-unique name (e.g., a 16-bit name). Further, each network device may store information related to update rates, connection sessions, and device resources. In short, each network device may maintain up-to-date information related to routing and scheduling. In some embodiments, the network manager software module 27 communicates this information to network devices whenever new devices (e.g., new field devices) join the network or whenever the network manager detects or originates a change in topology or scheduling of the wireless plant automation network 14.

In addition to generating, receiving, and/or forwarding data relating to the primary operations of the process control system 5 (e.g., temperature sensor data, data for controlling valve positions, etc.), the devices of the process control system 5 may use the wireless plant automation network 14 to communicate data relating to maintenance of devices in the process control system 5. For example, a field device may send data to a host when the field device is operating improperly (e.g., when a spool valve of a valve positioner is inoperable), or is at risk of improper operation (e.g., when a voltage of a power module of the device falls below a certain level). As another example, a field device may continuously or periodically send to a host workstation certain data relating to proper operation (e.g., data indicating a current power module voltage level). The host receiving such data (e.g., the host workstation 16 or 18) may display indicators based on that data via a graphical user interface (GUI), thereby allowing a human operator to take the appropriate corrective or preventive measures.

Figure 2:
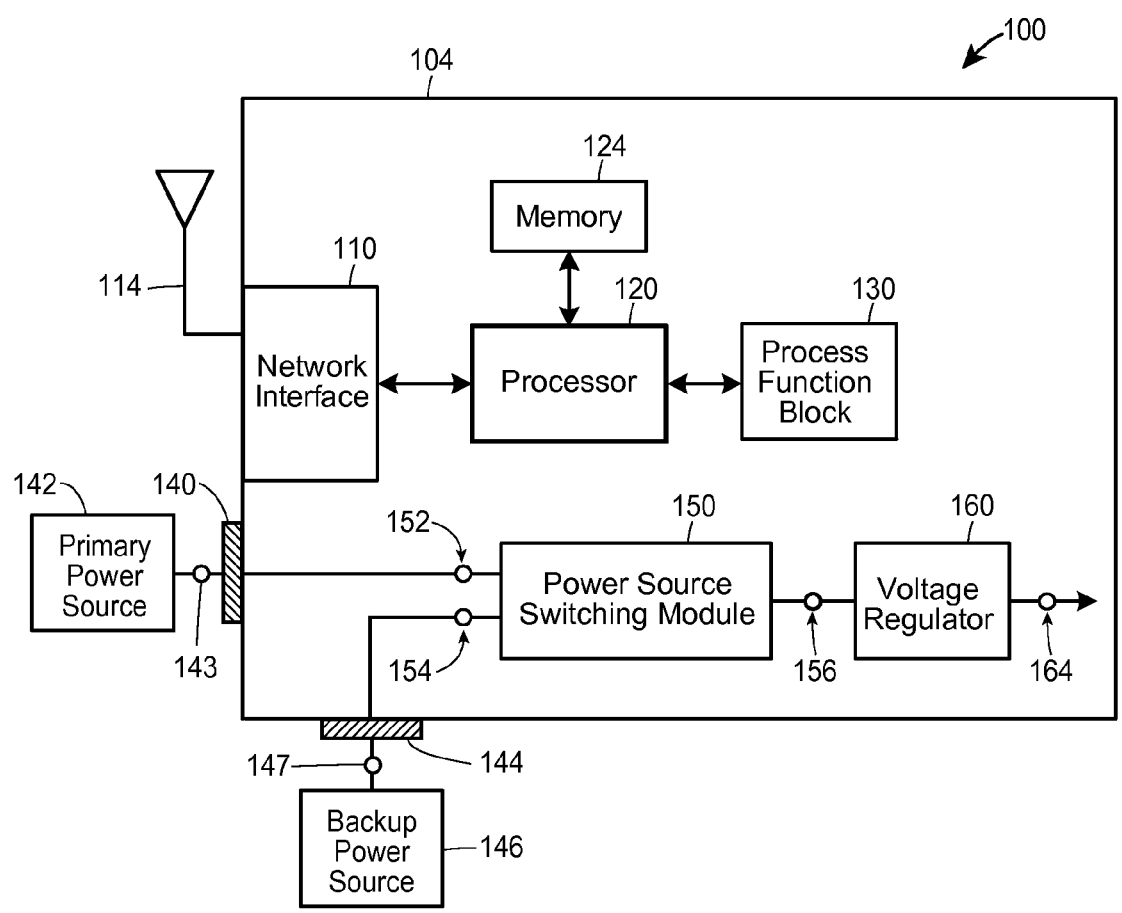
FIG. 2 is a block diagram of an example field device within a process control system such as the example system of FIG. 1.

FIG. 2 is a block diagram of an example field device 100 and a power switching module 150 assembled in accordance with a first disclosed example of the present invention. The field device 100 and the power source switching module 150 preferably are incorporated within a process control system such as the example process control system 5 of FIG. 1. The field device 100 may be, for example, one of the field devices 30-36 of FIG. 1, or may be any other field device employed in process control systems. The field device 100 includes a field device housing 104 that contains a network interface 110 configured to transmit and/or receive signals according to a particular wireless communication protocol of the process control system of which the field device is a part. In some embodiments, the wireless communication protocol is a wireless mesh network protocol, such as the WirelessHART or ISA 100.11a protocol, for example.

In some embodiments, the network interface 110 includes a transceiver (not shown). The transceiver typically includes one or more processors (also not shown) for executing instructions relating to physical (PHY) layer and other layer (e.g., medium access control (MAC) layer) tasks according to the wireless communication protocol utilized by the process control system. The network interface 110 may be coupled to an antenna 114 or, alternatively, to multiple antennas. Via the antenna 114, the network interface 110 transmits and/or receives data packets according to the wireless communication protocol. The network interface 110 is preferably configured to both transmit and receive data packets.

The network interface 110 of the example field device 100 is communicatively coupled to a processor 120, which is in turn communicatively coupled to a memory 124 and a process function block 130. The process function block 130 performs the primary function of the field device 100 within the process control system. For example, where the field device 100 is a valve positioner device, the process function block 130 may include a spool valve that controls air pressure output to a valve according to control signals from the processor 120. As another example, where the field device 100 is a temperature sensor device, the process function block 130 may include one or more temperature sensing transducers for converting temperature to digital signals that are sent to the processor 120. The memory 124 may store process-related variables (e.g., past sensor measurement values that the processor 120 received from the process function block 130, future control values that the processor 120 received from a network via the network interface 110, etc.), and/or may store routing and/or scheduling data pertaining to a network (e.g., the wireless plant automation network 14 of FIG. 1), for example. While the example field device 100 of FIG. 2 includes one processor 120, other embodiments may include two or more processors that perform the functions of the processor 120. Alternatively, the field device 100 may include a single processor that performs not only the functions of the processor 120, but also any processing required by the network interface 110. Moreover, any additional processing required by the process function block 130 may be performed by the processor 120, or by one or more separate processors.

The example field device 100 also includes a primary power port 140 configured to couple to a primary power source 142 via a removable coupling 143 of the primary power source 142. The primary power source 142 may be any device, module, etc. that stores energy and is capable of powering the field device 100 (i.e., capable of providing an appropriate voltage level while sourcing a sufficient level of current) during normal operation of the field device 100. In an embodiment, the primary power source 142 consists of one or more batteries (e.g., lithium thionyl chloride batteries). In another embodiment, the primary power source 142 is a self-contained power module that includes one or more batteries. For example, the primary power source 142 may include a power module having a housing in which one or more batteries are mounted, and/or having a board or other surface on which the one or more batteries are mounted.

The primary power port 140 includes at least two conductive, electrically isolated contact areas to electrically couple to the primary power source 142 via a removable coupling 143 of the primary power source 142. The primary power port 140 may have any one of various forms. For example, the primary power port 140 may include a set of pins or pin receptacles of an electrical connector that mate to the removable coupling 143 of the primary power source 142, where the removable coupling 143 is a set of pin receptacles or pins, respectively, of the primary power source 142. As another example, the primary power port 140 may include conductive (e.g., metal) surfaces that simply engage/contact conductive (e.g., metal) surfaces of the removable coupling 143, where the removable coupling 143 is a set of electrically isolated metal surfaces (e.g., battery electrodes) of the primary power source 142. In embodiments where the primary power port 140 includes an electrical connector, the electrical connector may be disposed within the field device housing 104 (e.g., be accessible only by opening the field device housing 104), or may be connected to the field device housing 104 (e.g., mounted to the exterior surface of the field device housing 104, or connected to the field device housing 104 via a cable).

In an embodiment, the primary power source 142 provides power to the entire field device 100 during normal operation. Alternatively, a portion of the field device 100 may not ever be powered by the primary power source 142. For example, the field device 100 may include one or more component modules or circuits that are powered only by a battery that is integrated within the field device 100.

To ensure that the field device 100 remains adequately powered and functional when removing the primary power source 142 (e.g., to replace a depleted primary power source 142), the example field device 100 further includes a backup power port 144 configured to couple to a backup power source 146 via a removable coupling 147 of the backup power source 146. Like the primary power source 142, the backup power source 146 may be any device, module, etc. that stores energy and is capable of sufficiently powering the field device 100 (or a portion thereof). The backup power source 146 may be, for example, similar to any of the various power sources described above with regard to the primary power source 142. The backup power source 146 may be the same type of power source as the primary power source 142, for example.

The backup power port 144 includes conductive, electrically isolated contact areas to electrically couple to the backup power source 146. The backup power port 144 and removable coupling 147 may be, for example, similar to any of the various power ports and removable couplings described above with regard to the primary power port 140 and removable coupling 143. In one embodiment, the backup power port 144 includes two or more conductive, protruding structures (e.g., posts, flanges, etc.), and the removable coupling 147 includes a set of wire leads (e.g., with clips for attaching to the protruding structures). In this example embodiment, the removable coupling 147 may include wire leads attached (e.g., clipped) to the power source module 142. A person installing the backup power source 146 may connect the wire leads to the protruding structures of the backup power port 144.

In an embodiment, the primary power port 140 and the backup power port 144 are situated such that the backup power source 146 can be freely installed and removed without interfering with the installation and removal of the primary power source 142, and vice versa. In embodiments where one or both of the primary power port 140 and the backup power port 144 include connectors that connect to the field device housing 104 via a cable, situating the primary power port 140 and backup power port 144 in this manner is generally straightforward (i.e., a cable may simply be moved to a clear location). In embodiments where the primary power port 140 and the backup power port 144 include connectors or contacts that are on or within the field device housing 104, however, placement of the ports 140, 144 may be critical, and depends in part on the sizes and shapes of the primary power source 142 and backup power source 146, the internal or external shape of the field device housing 104, and the orientations of the primary power source 142 and backup power source 146 when installed.

The example field device 100 further includes a power source switching module 150 having at least a first power terminal 152, a second power terminal 154, and a third power terminal 156. Each of the power terminals 152, 154, 156 may be a physical connector, or simply an electrical connection point (e.g., any location along a conductive wire, trace, or plane that is coupled to the power source switching module 150). The power source switching module 150 is electrically coupled to the primary power port 140 via the first power terminal 152, to the backup power port 144 via the second power terminal 154, and to a voltage regulator 160 via the third power terminal 156.

The power source switching module 150 is configured to switch between electrically coupling the primary power port 140 to the third power terminal 156 (via the first power terminal 152) and electrically coupling the backup power port 144 to the third power terminal 156 (via the second power terminal 154), thereby allowing either the primary power source 142 or the backup power source 146 to provide power at the third power terminal 156. The power source switching module 150 is discussed in more detail below in connection with FIG. 4.

The field device 100 also includes a voltage regulator 160 that accepts as an input the power provided by the primary power source 142 or backup power source 146 (according to the state of the power source switching module 150), and provides a well-regulated voltage at an output terminal 164. The output terminal 164 may directly couple to various modules and/or circuits of the field device 100, or may couple to the modules and/or circuits via additional filtering and/or regulators, for example. In some embodiments, the output terminal 164 delivers power to the entire field device 100. In other embodiments, the output terminal 164 delivers power to only a portion of the field device 100 (e.g., only the process function block 130, only the processor 120 and the process function block 130, etc.).

During normal operation of the field device 100, the primary power source 142 may generally be connected to the primary power port 140 and the backup power source 146 may generally be disconnected from the backup power port 144. When the primary power source 142 becomes depleted to a point where the primary power source 142 will soon not be able to provide adequate power to the field device 100, a warning or other indication may be displayed to a person responsible for maintaining the field device 100. For example, the responsible person may receive a low-voltage warning identifying the field device 100, with the warning being generated by a host workstation (e.g., the host workstation 16 and/or 18 of FIG. 1) based on data sent from the field device 100 to the host via the network interface 110 and antenna 114.

Upon receiving the warning or other indication, the responsible person may attempt to replace the primary power source 142 before the primary power source 142 loses its ability to adequately power the field device 100. To this end, the individual may bring a fully charged, replacement primary power source and a fully (or at least, adequately) charged backup power source to the location of the field device 100. In an embodiment, the individual then (in order): (1) installs the backup power source (e.g., by connecting the backup power source to the backup power port 144); (2) removes the depleted primary power source (e.g., by disconnecting the depleted primary power source from the primary power port 140); (3) installs the replacement primary power source (e.g., by connecting the replacement primary power source to the primary power port 140); and (4) removes the backup power source (e.g., by disconnecting the backup power source from the backup power port 144). In this manner, the field device 100 may remain continuously powered despite the replacement of a primary power source.

In other embodiments, the backup power source 146 is not intended to be removed from the field device 100 during normal operation. For example, the backup power source 146 may be a rechargeable cell that is charged by the primary power source 142 while the primary power source 142 is installed in the field device 100. In embodiments where the backup power source 146 is not removable from the field device 100, a person replacing a depleted or nearly-depleted primary power source generally need not bring a backup power source to the site of the field device 100.

Figure 3:
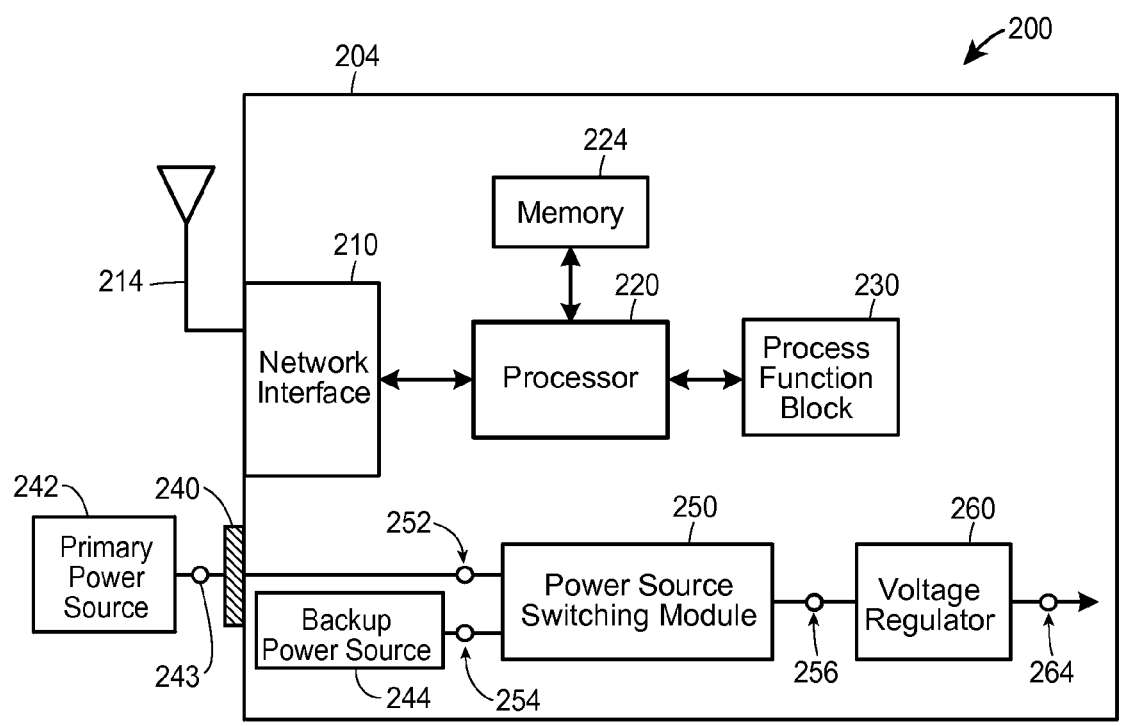
FIG. 3 is a block diagram of another example field device within a process control system such as the example system of FIG. 1.

FIG. 3 is a block diagram of an example field device 200 and power source switching module 250 assembled in accordance with a second disclosed example of the present invention. Like the field device 100 of FIG. 2, the field device 200 and the power source switching module 250 preferably are incorporated within a process control system such as the example process control system 5 of FIG. 1. The field device 200 may be, for example, one of the field devices 30-36 of FIG. 1, or may be any other field device employed in process control systems.

The example field device 200 includes a field device housing 204, network interface 210, antenna 214, processor 220, memory 224, and process function block 230, which may be similar, for example, to the housing 104, network interface 110, antenna 114, processor 120, memory 124, and process function block 130, respectively, of the field device 100 of FIG. 2. Moreover, the example field device 200 includes a primary power port 240 that couples to a primary power source 242 via a removable coupling 243, where the primary power port 240, primary power source 242, and removable coupling 243 may be similar to the primary power port 140, primary power source 142, and removable coupling 143 of FIG. 2.

Unlike the field device 100 of FIG. 2, however, the example field device 200 includes a backup power source 244 that is integrated within the field device 200. For example, the backup power source 244 may be a rechargeable cell, energy-storing capacitor, or energy-storing application-specific integrated circuit (ASIC), where the backup power source 244 is fixedly mounted within the field device 200. In some of these embodiments, the backup power source 244 is charged and/or recharged by the primary power source 240 while the primary power source 240 is installed. The backup power source 244 may be mounted on a printed circuit board, for example, such as a printed circuit board that also includes the network interface 210, processor 220, and/or memory 224.

The example field device 200 further includes a power source switching module 250 having at least a first power terminal 252, a second power terminal 254, and a third power terminal 256. The power source switching module 250 (with power terminals 252, 254, 256) may be similar to the power source switching module 150 (with power terminals 152, 154, 156) of FIG. 2 (discussed in more detail below with respect to FIG. 4), and may switch between the primary power source 242 and backup power source 244 in a manner similar to the power source switching module 150 switching between primary power source 142 and backup power source 144 of FIG. 2, for example. In the example field device 200, the backup power source 244 integrated within the field device 200 is permanently coupled to the second power terminal 254 of the power source switching module 250. The field device 200 also includes a voltage regulator 260 (with output terminal 264) that may be similar to the voltage regulator 160 (with output terminal 164) of FIG. 2, for example. As in the field device 100 of FIG. 2, the voltage regulator 260 may deliver power, via the output terminal 264, to the entire field device 200 or just a portion thereof, either directly or via other circuitry.

Although the example field device 200 includes the backup power source 244 at all times, the field device 200 is powered only by the primary power source 242 during normal operation, in some embodiments. For example, the primary power source 242 may supply power at a higher voltage level than the backup power source 244 when both power sources are fully charged, and the power source switching module 150 may connect only the power source 242 or 244 having the higher voltage level to the output terminal 264 of the power source switching module 250. When the primary power source 242 becomes depleted to a certain point (e.g., when the voltage level of the primary power source 242 falls below the voltage level of the backup power source 244), the field device 200 is instead powered by the backup power source 244.

Although the backup power source 244 need not be installed and may be used automatically when required (e.g., when the primary power source 242 becomes depleted beyond a certain level), a person responsible for maintaining the field device 200 may nonetheless receive a warning or other indication of the low-voltage condition of the primary power source 242. For example, the responsible person may receive a low-voltage warning identifying the field device 200, with the warning being generated by a host workstation (e.g., host workstation 16 and/or 18) based on data sent from the field device 200 to the host via the network interface 210 and antenna 214. In this scenario, the responsible person may attempt to replace the primary power source 242 before the backup power source 244 loses its ability to power the field device 200. To this end, the individual may bring a fully charged, replacement primary power source to the location of the field device 200. The individual may then remove the depleted primary power source (e.g., by disconnecting the depleted primary power source from the primary power port 240) and then install the replacement primary power source (e.g., by connecting the replacement primary power source to the primary power port 240). In this manner, the field device 200 may remain continuously powered despite the replacement of a primary power source Due to hazardous environments (e.g., environments that create a significant risk of explosion if a spark or flame is produced by a field device), some plants that include process control systems require that all devices in various areas of the plant strictly comply with certain safety standards. For example, "intrinsically safe" (IS) standards require certain energy limitations in process control devices, such as limitations on voltage and current levels. Accordingly, field devices such as the example field devices 100 and 200 of FIGS. 2 and 3 may include or consist of components, modules, or circuitry that are compliant with IS and/or other safety standards. Likewise, primary power sources and backup power sources for field devices (e.g., the primary power source 142 and backup power source 146 of FIG. 2, or the primary power source 242 and backup power source 244 of FIG. 3) may be compliant with IS and/or other safety standards.

Figure 4:
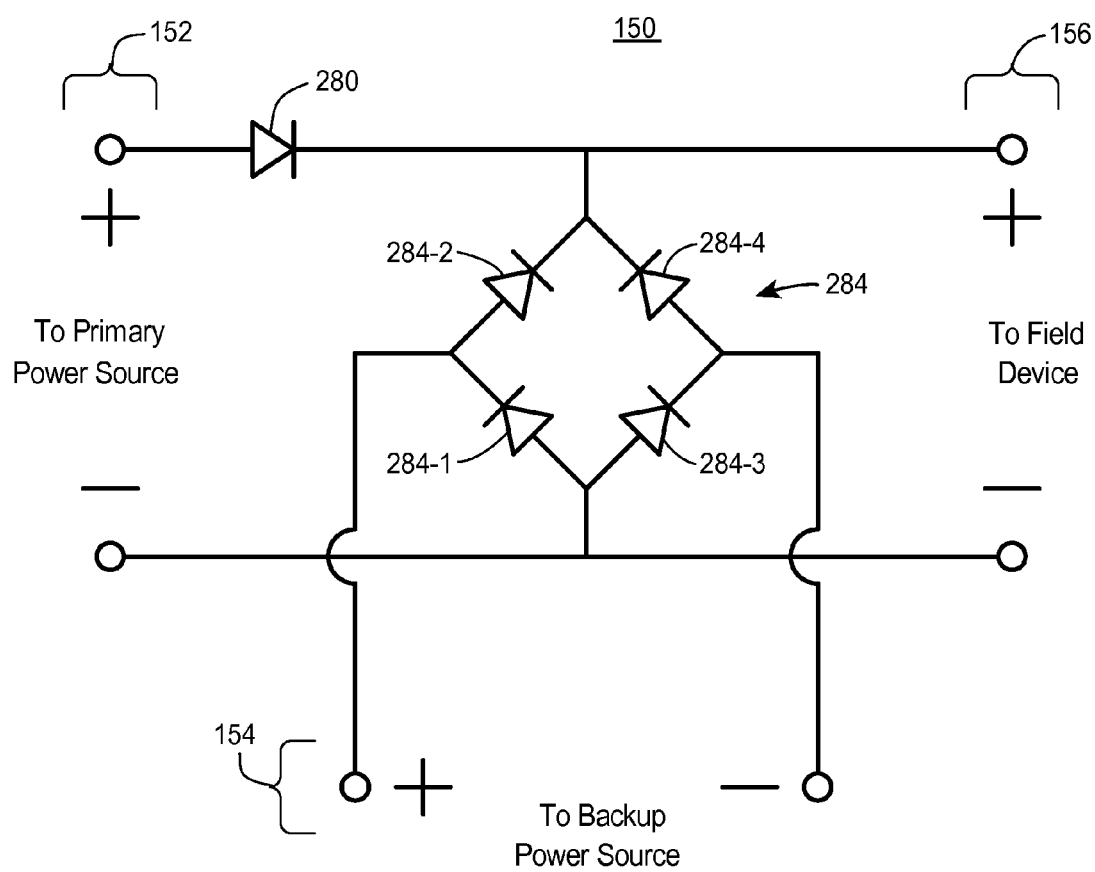
FIG. 4 is a schematic diagram of an example power source switching module of a field device such as the example field device of FIG. 2.

FIG. 4 is a schematic diagram of the power source switching module 150 in field device 100 of FIG. 2, according to an embodiment in which the power source switching module 150 is an analog switch. Alternatively, the power source switching module 150 illustrated in FIG. 4 may be the power source switching module 250 in field device 200 of FIG. 3. As discussed above in connection with FIG. 2, the power source switching module 150 includes a first power terminal 152 for coupling to a primary power source (e.g., the primary power source 142 of FIG. 2), a second power terminal 154 for coupling to a backup power source (e.g., the backup power source 146 of FIG. 2), and a third power terminal 156 for delivering power from the primary power source or backup power source to the field device (e.g., via the voltage regulator 160 of FIG. 2). As is also discussed above in connection with FIG. 2, power applied to the third power terminal 156 may be delivered to the entire field device or just a portion of the field device. Each of the power terminals 152, 154, and 156 includes at least a positive and a negative connection point, each of which may be a connector, pin, etc., or even an arbitrary point on a conductive wire, trace, or plane of the power source switching module 150.

The example power source switching module 150 is operable in a first state of operation to couple the first power terminal 152 to the third power terminal 156, and is operable in a second state of operation to couple the second power terminal 154 to the third power terminal 156. Each of the first state of operation and the second state of operation depends on the coupling state and/or voltage level of the primary power source and/or backup power source. For example, the first state of operation and/or the second state of operation may depend on whether the primary power source and/or the backup power source is coupled to first power terminal 154 and/or second power terminal 154, respectively. As another example, the first state of operation and/or the second state of operation may additionally depend on whether the primary power source and/or the backup power source are able to provide a particular voltage level.

In an example embodiment, the power source switching module 150 is in the first state of operation when both i) the first power terminal 152 is coupled to a primary power source (e.g., via a primary power port, such as the primary power port 140 of FIG. 2), and ii) the second power terminal 154 is not coupled to a backup power source (e.g., no backup power source is coupled to a backup power port, such as the backup power port 142 of FIG. 2) and/or the voltage of a primary power source coupled to the first power terminal 152 is above a threshold voltage level (e.g., above a voltage level of a backup power source coupled to the second power terminal 154). Various examples of threshold voltage levels are described below.

In another example embodiment, the power source switching module 150 is in the second state of operation when the second power terminal 154 is coupled to a backup power source (e.g., via a backup power port, such as the backup power port 142 of FIG. 2), and either i) no primary power source is coupled to the first power terminal 152 (e.g., no primary power source is coupled to a primary power port, such as the primary power port 140 of FIG. 2), or ii) a primary power source is coupled to the first power terminal 152 (e.g., via a primary power port, such as the primary power port 140 of FIG. 2) but the primary power source is unable to provide a threshold voltage level.

In the example power source switching module 150 illustrated in FIG. 4, analog circuitry performs the switching between the primary power source and backup power source. Specifically, the power source switching module 150 includes a set of diodes that includes diode 280 in the path between the positive side of the first power terminal 152 and the positive side of the third power terminal 156, and a diode ring 284 with diodes 284-1 through 284-4, as illustrated in FIG. 4. The diodes 280 and/or the diodes 284-1 through 284-4 of the set of diodes may be low-loss, high-power Schottky diodes, for example.

The power source switching module 150 illustrated in FIG. 4 operates to source power to a field device from the primary power source (via the first power terminal 152 and the third power terminal 156) when the primary power source is able to provide at least a threshold voltage level. When the backup power source is coupled to the second power terminal 154 of the example power source switching module 150, the threshold voltage level is equal to the voltage level of the backup power source if one assumes perfect matching of the voltage drops across diodes 280 and diodes 284-1 through 284-4. In practice, however, the voltage drops across diode 280 and each of the diodes 284-1 through 284-4 will vary. Accordingly, the threshold voltage level for the example power source switching module 150 is equal to the voltage level of the backup power source plus a positive or negative offset voltage that corresponds to the voltage drop mismatch of the diodes 280 and one or more of the diodes 284-1 through 284-4.

In an example scenario where a primary power source capable of supplying power at 6.90 V is coupled to the first power terminal 152, a backup power source capable of supplying power at 7.20 V is coupled to the second power terminal 154, and the offset voltage due to diode mismatch is −0.05 V, the primary power source voltage level is less than the threshold voltage level (i.e., 7.20 V−0.05 V=7.15 V), and therefore only the backup power source will supply power to the field device via the third power terminal 156. In rare scenarios where the primary power source and backup power source are both installed and both power source voltages are approximately equal (after accounting for the offset voltage), both power sources may temporarily supply power to the field device. Of course, when only one of the power sources (i.e., primary power source or backup power source) is connected to the respective power terminal (i.e., to the first power terminal 152 or the second power terminal 154, respectively), only the connected power source can supply power to the field device.

Other configurations of the circuitry within the power source switching module 150 are possible. For example, diodes 280 and/or diodes 284-1 through 284-4 may be arranged in a different manner. Moreover, the power source switching module 150 is not an analog switch in certain embodiments. In some embodiments, for example, the power source switching module 150 is a digital switch. In these embodiments, the power source switching module 150 may include switching circuitry (e.g., one or more high-power transistors) having a switching state that is controlled by a digital control signal generated by a processor, such as the processor 120 of FIG. 2. The processor may, for example, determine whether the primary power source is providing at least a threshold voltage level (e.g., by receiving information from a voltage detector circuit), and based on that determination send a corresponding control signal to the power source switching module 150 to set the appropriate state of the digital switch. The threshold voltage level for a digital switch may be a predetermined threshold voltage level. For example, the threshold voltage level may be represented by data stored in a memory (e.g., the memory 124 of FIG. 2 or the memory 224 of FIG. 3), which is accessed by the processor controlling the state of the digital switch. In another embodiment, the power source switching module 150 is a manually controllable switch (e.g., a toggle switch).

Figure 5A:
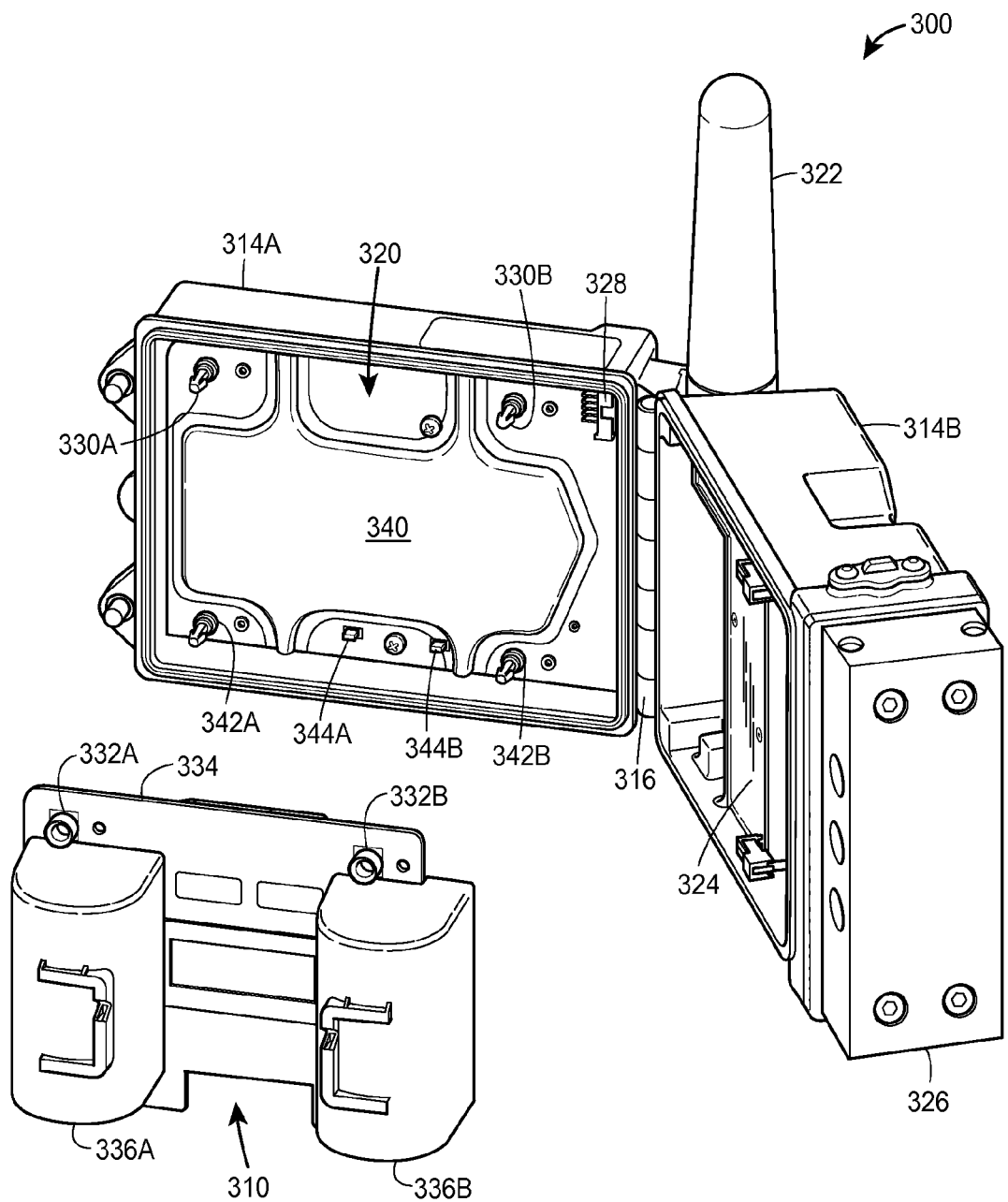
FIGS. 5A and 5B are perspective views of the interior of an example field device that illustrate an example primary power source in a removed and an installed position, respectively.
Figure 5B:
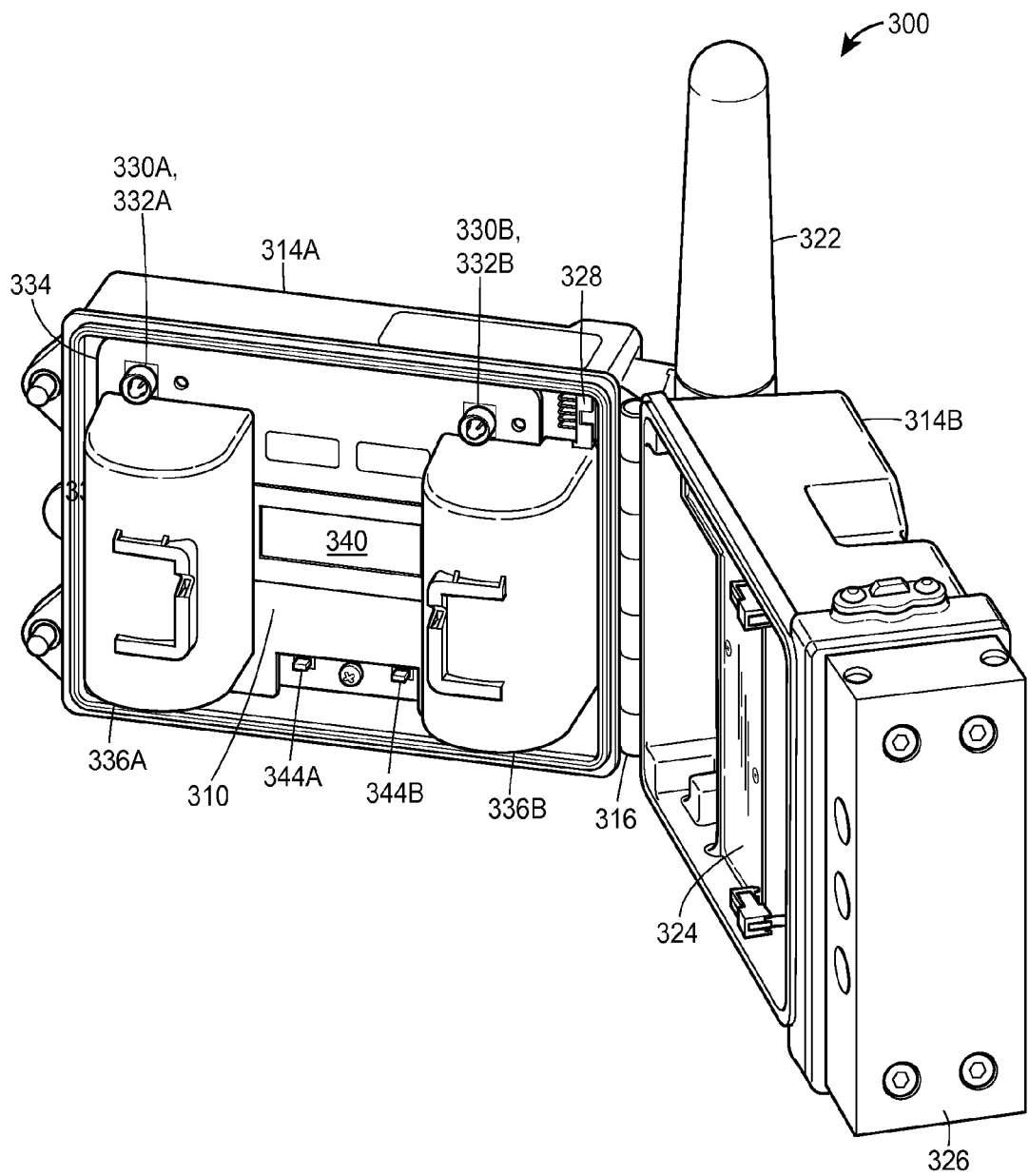

FIGS. 5A and 5B are perspective views of the interior of an example field device 300 that illustrate an example primary power source (i.e., power module 310) in a removed and an installed position, respectively. The field device 300 may be, for example, similar to the field device 100 of FIG. 2, and/or may be included in a process control system such as the process control system 5 of FIG. 1 (e.g., as one of the field devices 30-36). Referring first to FIG. 5A, the field device 300 includes a field device housing 314 that may be a rugged plastic or metal structure, for example. In the field device 300 shown in FIG. 5A, the field device housing 314 is accessed by separating a first field device housing portion 314A from a second field device housing portion 314B, where the field device housing portions 314A and 314B are connected by a hinge 316. Alternatively, the field device housing portions 314A and 314B may be connected by some other removable mechanical coupling, such as screws or a snap fit. In other embodiments, the interior of the field device housing 314 is not accessible by opening the device 300 in such a manner.

A printed circuit board (PCB) 320 is fixedly mounted within the first field device housing portion 314A, and may include (e.g., on the side of PCB 320 not shown in FIG. 5A) one or more processors and/or other circuitry or devices. The PCB 320 may include a network interface, a processor, and a memory, which may be similar to the network interface 110, processor 120, and memory 124 of FIG. 2, for example. Moreover, the PCB 320 may include some or all of the circuitry associated with the primary function of the field device 300 within the process control system (e.g., circuitry associated with the process function block 130 of FIG. 2). Further, the PCB 320 may include additional circuitry, such as a power source switching module similar to the power source switching module 150 and/or a voltage regulator similar to the voltage regulator 160 of FIG. 2.

The example field device 300 includes an antenna 322 connected to the field device housing 314 for communicating via a wireless network of the process control system (e.g., the wireless communication network 14 of FIG. 1). The antenna 322 may be, for example, similar to the antenna 114 of FIG. 2, and coupled to a network interface (e.g., similar to the network interface 110 of FIG. 2) contained within the field device housing 314 (e.g., on PCB 320).

The field device housing portion 314B contains a module 324 that performs a primary function of the field control device 300, such as sensing a valve position. The module 324 may be similar to the process function block 130 of FIG. 2, for example. The module 324 may include one or more processors (e.g., mounted on one or more PCBs within module 324) that control the operation of the module 324 (e.g., obtaining sensor data). Alternatively, the operation of the module 324 may be controlled by one or more processors on the PCB 320.

The field device housing portion 314B is mechanically connected to a second, external module 326 that performs another primary function of the field control device 300, such as positioning a valve. The module 326 may be similar to the process function block 130 of FIG. 2, for example. The module 326 may include one or more processors (e.g., mounted on one or more PCBs) that control the operation of the module 326 (e.g., adjusting pneumatic pressure via a spool valve in the module 326). Alternatively, the operation of the module 326 may be controlled by one or more processors on the PCB 320.

In embodiments where the module 324 and/or the module 326 are controlled via one or more processors on the PCB 320, and/or embodiments where power from the power module 310 is routed to the module 324 and/or the module 326, one or more electrical connectors may couple the PCB 320 to the appropriate module(s). In the example field device 300, a ribbon cable connector 328 provides a part of such a connection, with the ribbon cable itself not being shown for clarity.

While the example field device 300 illustrated in FIGS. 5A and 5B includes two modules 324, 326 for performing primary functions within a process control system, other embodiments may include only one such module, or more than two such modules. Moreover, other embodiments may include one or more modules that are disposed within (or externally connected to) the field device housing 314 in a different manner. As examples, the module 324 may be contained within the field device housing portion 314A, connected externally to the field device housing 314 (e.g., similar to module 326), or connected to the field device housing 314 via an external cable.

In the example embodiment of FIGS. 5A and 5B, the power module 310 is a removable power module. The field device 300 includes connectors 330 that provide a primary power port for electrically coupling to a removable coupling of the power module 310. In some embodiments, the connectors 330 electrically couple the power module 310 (when inserted as shown in FIG. 5B) to a terminal of a power source switching module (e.g., a power source switching module mounted on PCB 320), such as the first power terminal 152 of the power source switching module 150 in FIGS. 2 and 4. The connectors 330 include at least a positive connector 330A and a negative connector 330B for coupling to a removable coupling that includes a positive connector 332A and a negative connector 332B, respectively, of the power module 310. For the example field device 300 and example power module 310, the connectors 330 and the connectors 332 additionally provide some level of mechanical coupling between the field device 300 and the power module 310. In the embodiment shown in FIG. 5A, each of the connectors 330 is a banana plug, and each of the connectors 332 is a banana socket that mechanically mates to the respective banana plug.

The example power module 310 includes a board 334 which, when connectors 330 are mated to connectors 332, sits within the field device housing 314 as illustrated in FIG. 5B. In some embodiments, the board 334 can be mechanically fastened to the field device 300 by clips, screws, or other means when the power module 310 is installed. Mounted on board 334 are battery compartments 336. Each battery compartment 336 includes a housing that contains a battery (not shown in FIG. 5A or 5B), such as a lithium thionyl chloride battery. The batteries within the compartments 336 may be serially connected by traces on the board 334, for example, and provide a particular voltage when fully charged (e.g., 7.2 V where the battery compartments 336A and 336B each contain one of two serially connected 3.6 V batteries).

While the primary power source illustrated in FIG. 5A (i.e., power module 310) has the configuration described above, different primary power sources may be used in other embodiments. For example, the primary power source may include only one battery or more than two batteries, and/or multiple batteries may be connected in parallel. As another example, the primary power source may not include the board 334 (e.g., the primary power source may consist entirely of one or more batteries, without the board 334 or battery compartments 336).

Within the example field device 300, the PCB 320 includes a potting area 340. The potting area 340 lies between the PCB 320 and the power module 310 when the power module 310 is installed in the example field device 300 as shown in FIG. 5B, and may serve to render the field device 300 compliant with IS or other safety standards. For example, the potting area 340 may help to keep energy away from any combustible gases in the air, or from any combustible dust on the surface of the PCB 320.

In addition to the power connectors 330, the example field device 300 includes connectors 342 to allow coupling to a wired communication interface (e.g., a wired HART interface). The wired interface may be used for maintenance and/or setup purposes, for example. For example, before the field device 300 is connected to a wireless network for the first time, the field device 300 may require configuration via a wired interface, and/or information about the field device 300 may need to be obtained via the wired interface so that it can be entered into the process control system. A person responsible for maintenance and setup of the process control system may link to the field device 300 via the connectors 342 for this purpose by using a handheld device, such as the handheld device 55 of FIG. 1. While the connectors 342 shown in FIG. 5A are banana plugs, other connectors may be used. Although not shown in FIGS. 5A and 5B, the power module 310 may include connectors (e.g., banana sockets) that couple to the connectors 342 and act as a "pass-through" (i.e., allow a device to couple to the connectors 342 even when the power module 310 is installed). In some embodiments, the field device 300 does not include connectors 342.

The field device 300 also includes contact areas 344 that act as a backup power port for electrically coupling a backup power source (not shown) to the field device 300. In an embodiment, the contact areas 344 electrically couple the backup power source to a terminal of a power source switching module (e.g., on PCB 320), such as the second power terminal 154 of the power source switching module 150 in FIGS. 2 and 4. The contact areas 344 include at least a positive contact area 344A and a negative contact area 344B for coupling to a removable coupling (e.g., a corresponding positive contact area and negative contact area) of the backup power source. The contact areas 344 are positioned within the example field device 300 such that, when the power module 310 is installed within the field device housing 314 as illustrated in FIG. 5B, the contacts 344 remain accessible.

The contact areas 344 of the example field device 300 are conductive tabs or flanges that provide conductive structures for attaching leads/wires from a backup power source (e.g., via leads with clips). For example, a backup power source may be connected to contact areas 344 by clipping leads from the positive contact area 344A and negative contact area 344B to positive and negative electrodes of a battery, or to positive and negative connectors of a backup power source identical to the power module 310. As discussed above in connection with FIGS. 2 and 3, other embodiments may instead include different types of backup power ports, backup power sources, and removable couplings, or may omit the backup power port and removable coupling entirely (e.g., for certain types of backup power sources that are integrated within the field device 300).

The field device housing 314 of the example field device 300 is configured such that once the power module 310 is installed as shown in FIG. 5B, the field device 300 may be closed by bringing the field device housing portions 314A and 314B together. While FIGS. 5A and 5B show an embodiment in which the contact areas 344 for the backup power source are inaccessible once the field device 300 is closed, the contact areas 344 remain accessible when the field device 300 is closed in some other embodiments (e.g., by including a cutaway in the field device housing 314, providing a connector that passes through the field device housing 314, etc.).

While various functions and/or systems of field devices have been described herein as "modules," "components," or "function blocks," it is noted that these terms are not limited to single, integrated units. Moreover, while the present invention has been described with reference to specific examples, those examples are intended to be illustrative only, and are not intended to limit the invention. It will be apparent to those of ordinary skill in the art that changes, additions or deletions may be made to the disclosed embodiments without departing from the spirit and scope of the invention.

What is claimed is:

1. A continuously powered field device for use in a process control system, the field device comprising:
   a field device housing;
   a network interface disposed within, or externally connected to, the field device housing and communicatively coupled between a host and a process function block within the field device, the network interface is configured to perform at least one of: transmit process control signals to the host or receive process control signals from the host;
   a module disposed within, or externally connected to, the field device housing, the module being configured to perform one or more of (i) a control function external of the field device, (ii) a monitoring function external of the field device, or (iii) a physical function external of the field device, within the process control system;
   a primary power port, wherein the primary power port includes a first connector configured to electrically and mechanically couple to a first mating connector of a primary power source comprising a first set of one or more batteries, and wherein the primary power port and the primary power source are both disposed within the field device housing when the first connector and the first mating connector are electrically and mechanically coupled together and the field device housing is in the closed position;
   a backup power port connected to an exterior of the field device housing, wherein the backup power port includes either (i) a second connector configured to electrically and mechanically couple to a backup power source comprising a second set of one or more batteries via a second mating connector included on the backup power source, or (ii) a plurality of protruding structures each configured to electrically and mechanically couple to the backup power source via a respective one of a plurality of clips connected to wire leads of the backup power source, wherein the backup power source is a module that is external of the field device;
   a battery integrated within the field device; and
   a power source switching module comprising a first power terminal, a second power terminal, and a third power terminal, wherein
      the first power terminal is coupled to the primary power port,
      the second power terminal is coupled to the backup power port,
      the third power terminal is configured to deliver power applied to the third power terminal to at least a portion of the field device, the power source switching module in a first state of operation couples the first power terminal to the third power terminal, and the power source switching module in a second state of operation couples the second power terminal to the third power terminal, wherein the network interface and the module are continuously powered via the third power terminal while at least one of the primary power source or the backup power source is capable of providing power to the field device, and wherein at least a powered portion of the field device is powered by the battery that is integrated within the field device, when the battery that is integrated within the field device is capable of providing power, and is not ever powered by the primary power source.

2. The continuously powered field device of claim 1, wherein the power source switching module is in the second state of operation when:

the second power terminal is coupled to a backup power source, and the primary power port is either i) not coupled to the primary power source or ii) coupled to the primary power source when the primary power source is unable to provide a threshold voltage level.

3. The continuously powered field device of claim 2, wherein the power source switching module is an analog switch including a set of diodes, and the threshold voltage level is equal to a voltage level of the backup power source plus an offset voltage corresponding to a voltage drop mismatch of the set of diodes.

4. The continuously powered field device of claim 2, wherein the power source switching module is a digital switch, and the threshold voltage level is a predetermined threshold voltage level.

5. The continuously powered field device of claim 1, wherein the power source switching module is a manually controllable switch.

6. The continuously powered field device of claim 1, wherein the power source switching module is in the first state of operation when:

the first power terminal is coupled to the primary power source via the primary power port, and at least one selected from the group consisting of i) the backup power port is not coupled to the backup power source and ii) a voltage of the primary power source is above a threshold voltage level, and the power source switching module is in the second state of operation when:

the second power terminal is coupled to the backup power source via the backup power port, and the primary power port is either i) not coupled to the primary power source or ii) coupled to the primary power source when the primary power source is unable to provide the threshold voltage level.

7. The continuously powered field device of claim 1, further comprising a processor and the network interface communicatively coupled to the processor.

8. The continuously powered field device of claim 7, wherein the network interface is configured to communicate according to a wireless mesh network protocol.

9. The continuously powered field device of claim 7, wherein the network interface causes an indication relating to a voltage of the primary power source that is coupled to the primary power port to be transmitted to a workstation via a wireless network.

10. A method of providing continuous power to a field device in a process control system, the method comprising:

providing a field device housing;

providing a network interface communicatively coupled between a host and a process function block within the field device, the network interface is configured to perform at least one of: transmit signals to the host or receive signals from the host;

providing a module disposed within, or externally connected to, the field device housing, the module being configured to perform one or more of (i) a control function, (ii) a monitoring function, or (iii) a physical function, within the process control system;

providing a primary power port, wherein the primary power port includes a first connector configured to electrically and mechanically couple to a first mating connector of a primary power source comprising a first set of one or more batteries, and wherein the primary power port and the primary power source are both disposed within the field device housing when the first connector and the first mating connector are electrically and mechanically coupled together and the field device housing is in the closed position;

providing a backup power port connected to the field device housing, wherein the backup power port includes either (i) a second connector configured to electrically and mechanically couple to a backup power source comprising a second set of one or more batteries via a second connector included on the backup power source, or (ii) a plurality of protruding structures each configured to electrically and mechanically couple to the backup power source via a respective one of a plurality of clips connected to wire leads of the backup power source, wherein the backup power source is a module that is external of the field device;

integrating a battery within the field device;

providing a first power terminal, a second power terminal, and a third power terminal, wherein the first power terminal is coupled to the primary power port, the second terminal is coupled to the backup power port, and the third power terminal is configured to deliver power applied to the third power terminal to at least a portion of the field device;

automatically coupling the first power terminal to the third power terminal during a first state of operation; and automatically coupling the second power terminal to the third power terminal during a second state of operation, wherein the network interface and the module are continuously powered via the third power terminal while at least one of the primary power source or the backup power source is capable of providing power to the field device, and wherein at least a powered portion of the field device is powered by the battery that is integrated within the field device, when the battery that is integrated within the field device is capable of providing power, and is not ever powered by the primary power source.

11. The method of claim 10, further comprising:

automatically decoupling the second power terminal from the third power terminal during the first state of operation; and automatically decoupling the first power terminal from the third power terminal during the second state of operation.

12. The method of claim 10, wherein
the first state of operation occurs when:
the first power terminal is coupled to the primary power source via the primary power port, and
at least one selected from the group consisting of i) the backup power port is not coupled to a backup power source and ii) a voltage of the primary power source is above a threshold voltage level, and
the second state of operation occurs when:
the second power terminal is coupled to the backup power source, and
the primary power port is either i) not coupled to the primary power source or ii) coupled to the primary power source when the primary power source is unable to provide the threshold voltage level.

13. An intrinsically safe (IS), continuously powered, field device for use in a hazardous environment within a process control system, the field device comprising:
a field device housing;
a network interface disposed within, or externally connected to, the field device housing and communicatively coupled between a host and a process function block, the network interface is configured to perform at least one of: transmit signals to the host or receive signals from the host;
a module disposed within, or externally connected to, the field device housing, the module being configured to perform one or more of (i) a control function within the process control system, (ii) a monitoring function within the process control system, or (iii) a physical function within the process control system;
a primary power port, wherein the primary power port includes a first connector configured to electrically and mechanically couple to a first mating connector of a primary power source comprising a first set of one or more batteries, and wherein the primary power port and the primary power source are both disposed within the field device housing when the first connector and the first mating connector are electrically and mechanically coupled together and the field device housing is in the closed position;
a backup power port connected to the field device housing, wherein the backup power port includes either (i) a second connector configured to electrically and mechanically couple to a backup power source comprising a second set of one or more batteries via a second mating connector included on the backup power source, or (ii) a plurality of protruding structures each configured to electrically and mechanically couple to the backup power source via a respective one of a plurality of clips connected to wire leads of the backup power source, wherein the backup power source is a module that is external of the field device;
a battery integrated within the field device; and
a power source switching module comprising a first power terminal, a second power terminal, and a third power terminal, wherein
the first power terminal is coupled to the primary power port,
the second power terminal is coupled to the backup power port,
the third power terminal is configured to deliver power applied to the third power terminal to at least a portion of the field device,
the power source switching module in a first state of operation couples the first power terminal to the third power terminal, and
the power source switching module in a second state of operation couples the second power terminal to the third power terminal, wherein the network interface and the module are continuously powered via the third power terminal while at least one of the primary power source or the backup power source is capable of providing power to the field device, and wherein at least a powered portion of the field device is powered by the battery that is integrated within the field device, when the battery that is integrated within the field device is capable of providing power, and is not ever powered by the primary power source.

* * * * *